(12) United States Patent
Mooney et al.

(10) Patent No.: US 10,089,270 B2
(45) Date of Patent: Oct. 2, 2018

(54) INTERCHANGEABLE POWER AND SIGNAL CONTACTS FOR IO CONNECTORS

(75) Inventors: Stephen R. Mooney, Mapleton, UT (US); Howard L. Heck, Hillsboro, OR (US); James E. Jaussi, Hillsboro, OR (US); Frank T. Hady, Portland, OR (US); Bryan K. Casper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 13/995,594

(22) PCT Filed: Oct. 17, 2011

(86) PCT No.: PCT/US2011/056581
§ 371 (c)(1),
(2), (4) Date: Mar. 31, 2014

(87) PCT Pub. No.: WO2013/058730
PCT Pub. Date: Apr. 25, 2013

(65) Prior Publication Data
US 2014/0197696 A1 Jul. 17, 2014

(51) Int. Cl.
*H01H 35/00* (2006.01)
*H01H 83/00* (2006.01)
(Continued)

(52) U.S. Cl.
CPC ............ *G06F 13/385* (2013.01); *G06F 1/266* (2013.01); *H01H 9/54* (2013.01); *H01R 13/6658* (2013.01); *Y10T 307/74* (2015.04)

(58) Field of Classification Search
CPC ...... H01R 13/6658; H01H 9/54; G06F 1/266; G06F 1/26; G06F 1/3203; G06F 13/385; Y10T 307/766; Y10T 307/74
See application file for complete search history.

(56) References Cited

U.S. PATENT DOCUMENTS 6,662,301 B1    12/2003  Sekine et al.
7,447,922 B1 *  11/2008  Asbury .................. G06F 1/266
                                                710/303
(Continued)

FOREIGN PATENT DOCUMENTS

CN        1726623 A      1/2006
JP     2008015629 A      1/2008
(Continued)

OTHER PUBLICATIONS

Office Action and Search Report for Taiwanese Patent Application No. 101135594, dated May 25, 2015, 11 pages including 6 pages of English translation.
(Continued)

*Primary Examiner* — Rexford Barnie
*Assistant Examiner* — Rasem Mourad
(74) *Attorney, Agent, or Firm* — Jordan IP Law, LLC

(57) ABSTRACT

Systems and methods of interconnecting devices may include an input/output (IO) connector assembly having a voltage regulator, one or more signaling circuits, a first set of contacts, a second set of contacts connected to the one or more signaling circuits, and logic to receive a configuration command. The logic may also connect the first set of contacts to the voltage regulator if the configuration command corresponds to a first protocol. If the configuration command corresponds to a second protocol, on the other hand, the logic can connect the first set of contacts to the one or more signaling circuits.

20 Claims, 3 Drawing Sheets

(51) Int. Cl.
*G06F 13/38* (2006.01)
*G06F 1/26* (2006.01)
*H01H 9/54* (2006.01)
*H01R 13/66* (2006.01)

(56) References Cited

U.S. PATENT DOCUMENTS

| | | |
|---|---|---|
| 2003/0070103 A1 | 4/2003 | Kim |
| 2004/0204185 A1* | 10/2004 | Snyder ................ H01R 31/02 455/574 |
| 2004/0235357 A1 | 11/2004 | Allison et al. |
| 2008/0167828 A1* | 7/2008 | Terlizzi ................ H04L 27/32 702/64 |
| 2008/0272741 A1* | 11/2008 | Kanamori ............. G06F 1/266 320/137 |
| 2010/0007473 A1* | 1/2010 | Fadell ................ G06F 13/426 713/300 |
| 2010/0041266 A1 | 2/2010 | Data et al. |
| 2010/0205463 A1 | 8/2010 | Magnusson |
| 2010/0225176 A1* | 9/2010 | Bhargava .......... H04M 1/72527 307/125 |
| 2011/0127950 A1* | 6/2011 | Veselic ................ G06F 1/266 320/107 |
| 2011/0167179 A1* | 7/2011 | Feyk .................. G06F 13/385 710/62 |
| 2011/0260309 A1* | 10/2011 | Lee .................... G01R 1/0466 257/676 |

FOREIGN PATENT DOCUMENTS

| | | |
|---|---|---|
| JP | 2010-282617 A | 12/2010 |
| JP | 2014-534509 A | 12/2014 |
| TW | M390483 | 10/2010 |
| TW | 201135472 A | 10/2011 |
| TW | 201337576 A | 9/2013 |
| WO | 2011063379 A1 | 5/2011 |
| WO | 2013/058730 A1 | 4/2013 |

OTHER PUBLICATIONS

Office Action for Japanese Patent Application No. 2014-535706, dated Jan. 27, 2015, 5 pages including 2 pages of English translation.

International Preliminary Report on Patentability and Written Opinion received for PCT Patent Application No. PCT/US2011/056581, dated May 1, 2014, 5 pages.

International Search Report and Written Opinion received for PCT Application No. PCT/US2011/056581, dated May 16, 2012, 8 pages.

Office Action for Taiwanese Patent Application No. 101135594, dated Sep. 30, 2015, 9 pages including 5 pages of English translation.

Office Action for Taiwanese Patent Application No. 101135594, dated Sep. 14, 2017, 13 pages including 7 pages of English Translation.

Office Action for TW Patent Application No. 101135594, dated Sep. 14, 2017, (13 pages) including 8 pages of English translation.

* cited by examiner

INTERCHANGEABLE POWER AND SIGNAL CONTACTS FOR IO CONNECTORS

BACKGROUND

Technical Field

Embodiments generally relate to input/output (IO) interfaces. More particularly, embodiments relate to an IO connector having contacts that are dynamically reconfigurable between signaling and power supply functionality.

Discussion

Computing systems may include one or more USB (Universal Serial Bus, e.g., USB Specification 3.0, Rev. 1.0, Nov. 12, 2008, USB Implementers Forum) ports to support IO communication with peripheral components such as keyboards, mice, cameras, and so forth. The contacts of a typical USB port may be dedicated to either signaling or power supply functionality. Accordingly, the underlying computing system may have limited ability to connect to different peripheral components with varying signaling and power supply requirements.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an input/output (IO) connector assembly having a voltage regulator, one or more signaling circuits, a first set of contacts, a second set of contacts connected to the one or more signaling circuits, and logic to receive a configuration command. The logic may also be configured to connect the first set of contacts to the voltage regulator if the configuration command corresponds to a first protocol. If the configuration command corresponds to a second protocol, the logic can connect the first set of contacts to the one or more signaling circuits.

Embodiments may also include a system having a host device with host logic to issue a configuration command, a power supply, and an IO connector assembly. The IO connector assembly can include a voltage regulator connected to the power supply, one or more signaling circuits, a first set of contacts, a second set of contacts connected to the one or more signaling circuits, and connector logic to receive the configuration command. The connector logic may also be configured to connect the first set of contacts to the voltage regulator if the configuration command corresponds to a first protocol. If the configuration command corresponds to a second protocol, the connector logic can connect the first set of contacts to the one or more signaling circuits.

Other embodiments involve a computer implemented method in which a configuration command is issued to an IO connector assembly. A first set of contacts of the IO connector assembly may be connected to a voltage regulator of the IO connector assembly if the configuration command corresponds to a first protocol. The method can also provide for connecting the first set of contacts to one or more signaling circuits of the IO connector assembly if the configuration command corresponds to a second protocol.

In addition, embodiments may include a computer readable storage medium having a set of instructions which, if executed by a processor, cause a computer to detect a connection of a device to an IO connector assembly, and conduct a protocol analysis with respect to the device. The instructions can also cause a computer to issue a configuration command to the IO connector assembly based on the protocol analysis.

Figure 1:
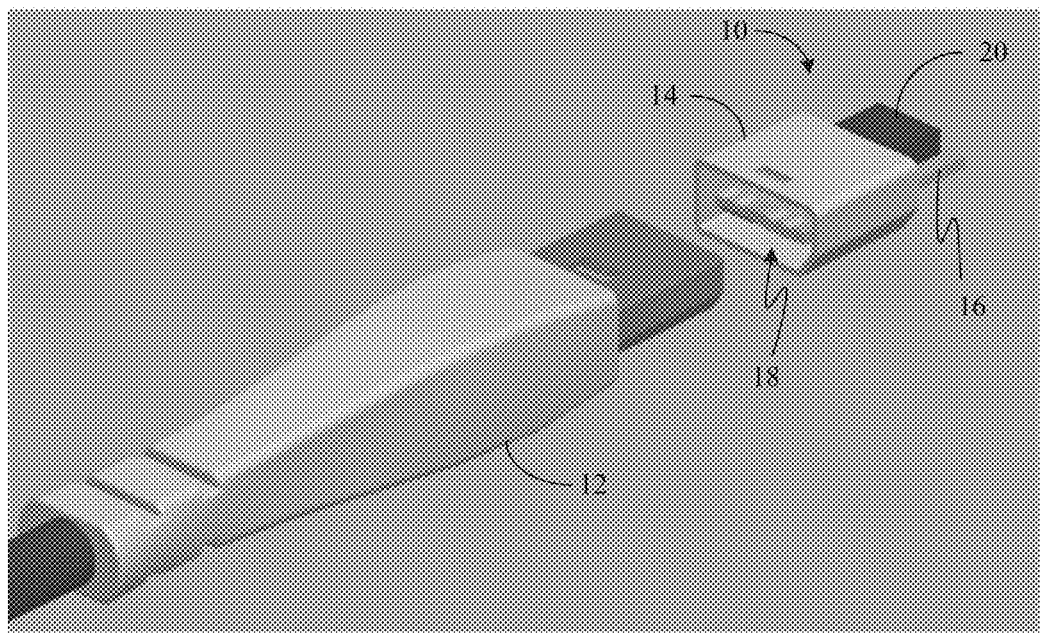
FIG. 1 is a perspective view of an example of a connection between a device and an IO connector assembly according to an embodiment.

Turning now to FIG. 1, a wired connection is shown between a connector assembly 10 and a peripheral device (not shown) having a cable 12 configured to mate with the connector assembly 10. The mating arrangement (e.g., key shape) and underlying signaling protocol may be in accordance with, for example, USB technology, DisplayPort (DP, e.g., Embedded DisplayPort Standard (eDP) Version 1.3, January 2011, Video Electronics Standards Association) technology, High-Definition Multimedia Interface (HDMI, e.g., HDMI Specification, Ver. 1.3a, Nov. 10, 2006, HDMI Licensing, LLC) technology, Thunderbolt (e.g., Thunderbolt™ Technology: The Transformational PC I/O, 2011, Intel Corporation) technology, Peripheral Components Interconnect Express (PCI-e, e.g., PCI Express x16 Graphics 150W-ATX Specification 1.0, PCI Special Interest Group) technology, and so forth. The mating arrangement could also be in accordance with a universal connector technology that is compatible with two or more of the aforementioned protocols.

In the illustrated example, the connector assembly 10 has a housing 14 and a substrate (e.g., interposer) 16 with contacts 18 disposed within the housing 14. The connector assembly 10 may also include a transceiver logic semiconductor package 20 mounted to the substrate 16. As will be discussed in greater detail, one or more of the contacts 18 may be "interchangeable" in the sense that they may be selectively connected to either a voltage regulator (VR) or one or more signaling circuits resident on the semiconductor package 20 depending upon the signaling and/or power requirements (e.g., protocol) of the device associated with the cable 12.

Figure 2:
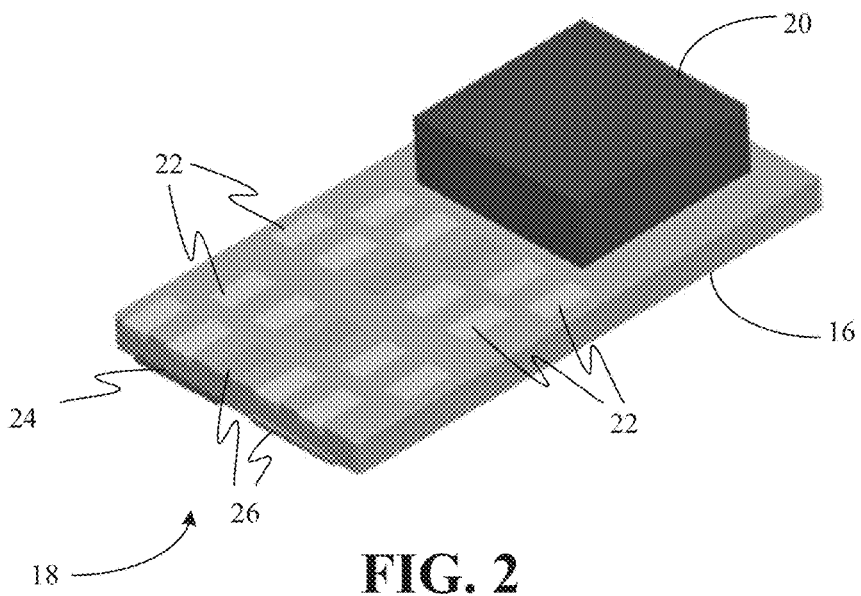
FIG. 2 is an enlarged perspective view of an example of an IO connector assembly substrate according to an embodiment.

FIG. 2 shows an enlarged view of a portion of the connector assembly 10 (FIG. 1) in which the contacts 18 include several IO contacts 22, a power contact 24 and several ground contacts 22 coupled to the substrate 16. While the IO contacts 22 are mounted to the lop of the substrate 16 and the power contact 24 is mounted to the bottom of the substrate 16 in the example shown, the configuration and placement of the contacts 22, 24, 26 can vary depending upon the circumstances. As already noted, the semiconductor package 20 may include a VR and one or more signaling circuits that may be selectively connected to the contacts 22, 24, 26 on an as-needed basis.

Figure 3A:
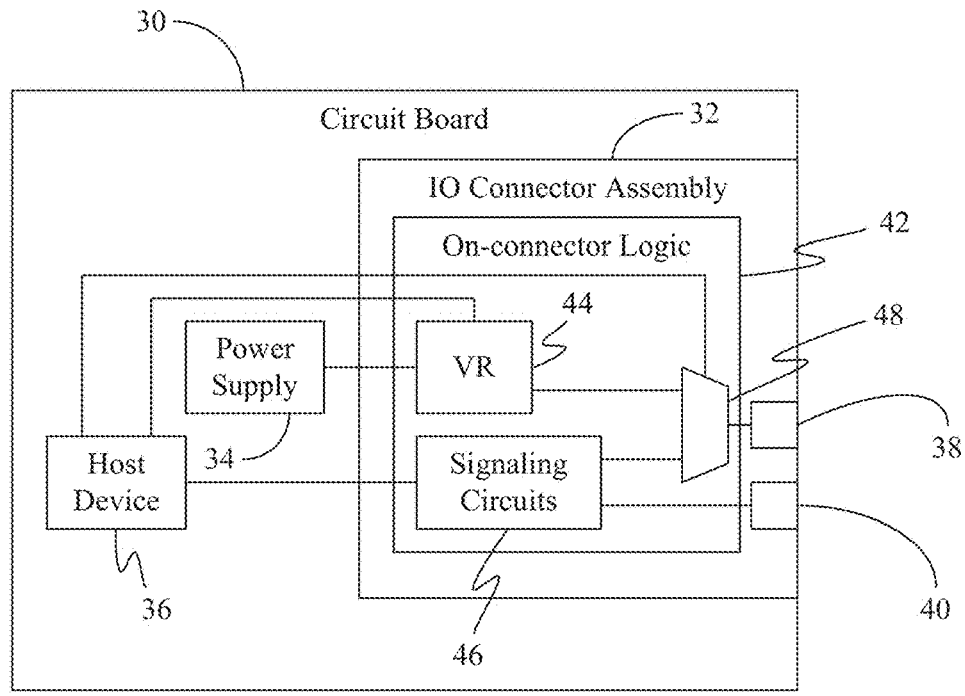
FIGS. 3A and 3B are block diagrams of examples of interchangeable contact configurations according to embodiments.

Turning now to FIG. 3A, a circuit board 30 is shown, wherein the illustrated circuit board 30 includes an IO connector assembly 32, a power supply 34 and a host device 36. The circuit board 30 could be a motherboard of a computing system such as a personal digital assistant (PDA), mobile Internet device (MID), wireless smart phone, media player, imaging device, smart tablet, desktop personal computer (PC), server, etc., or any combination thereof. In addition, the host device 36 may include a chipset component such as a processor and/or platform controller hub (PCH) capable of executing logic instructions in support of various computing related activities. The circuit board 30 could also include other components such as system memory, an integrated memory controller, a network controller, a graphic processor/card, etc., wherein each of these components may be configured to communicate via the IO connector assembly 32. In the illustrated example, the IO connector assembly 32 includes on-connector logic 42 having a voltage regulator (VR) 44 and one or more signaling circuits 46. The VR 44 may be used to power the IO connector assembly 32 as well as a peripheral device (not shown) coupled the IO connector assembly 32, and the signaling circuits 46 may enable the transfer of data between the IO connector assembly 32 and the peripheral device.

The IO connector assembly 32 can also include a first set of contacts 38 designated as interchangeable contacts. For example, the first set of contacts 38 could include one or more of the IO contacts 22 (FIG. 2) as well as the power contact 24 (FIG. 2), discussed above. The second set of contacts 40, on the other hand, may be limited to one or more of the IO contacts 22 (FIG. 2) and has a fixed connection with the signaling circuits 46 in the example shown. Thus, the second set of contacts 40 might be considered dedicated IO contacts. The illustrated on-connector logic 42 includes a multiplexer 48 coupled to the VR 44, the signaling circuits 46, the first set of contacts 38, and the host device 36. Upon detecting the connection of a peripheral device to the IO connector assembly 32, the host device 36 may conduct a protocol analysis with respect to the peripheral device to determine, for example, whether power is to be applied to the peripheral device. The protocol analysis could also identify other considerations such as contact position, configuration, usage, and so forth.

For example, the IO connector assembly 32 might be able to support a first protocol in which the first set of contacts 38 is used to power the peripheral device, as well as a second protocol in which the first set of contacts 38 is used to communicate with the peripheral device. Accordingly, the host device 36 may issue a configuration command to the on-connector logic 42, wherein if the configuration command corresponds to the first protocol, the multiplexer 48 connects the first set of contacts 38 to the VR 44. If, on the other hand, the configuration command corresponds to the second protocol, the multiplexer 48 may connect the first set of contacts 38 to the signaling circuits 46. The illustrated host device 36 may also set the output voltage of the VR 44 based on the protocol analysis. Thus, if the first set of contacts 38 is connected to the signaling circuits 46 (e.g., second protocol is used), the output voltage of the VR 44 might be set to a lower level due to the reduced power delivery requirements. Indeed, the VR 44 may be powered down altogether in certain circumstances to further conserve power and/or extend battery life.

Figure 3B:
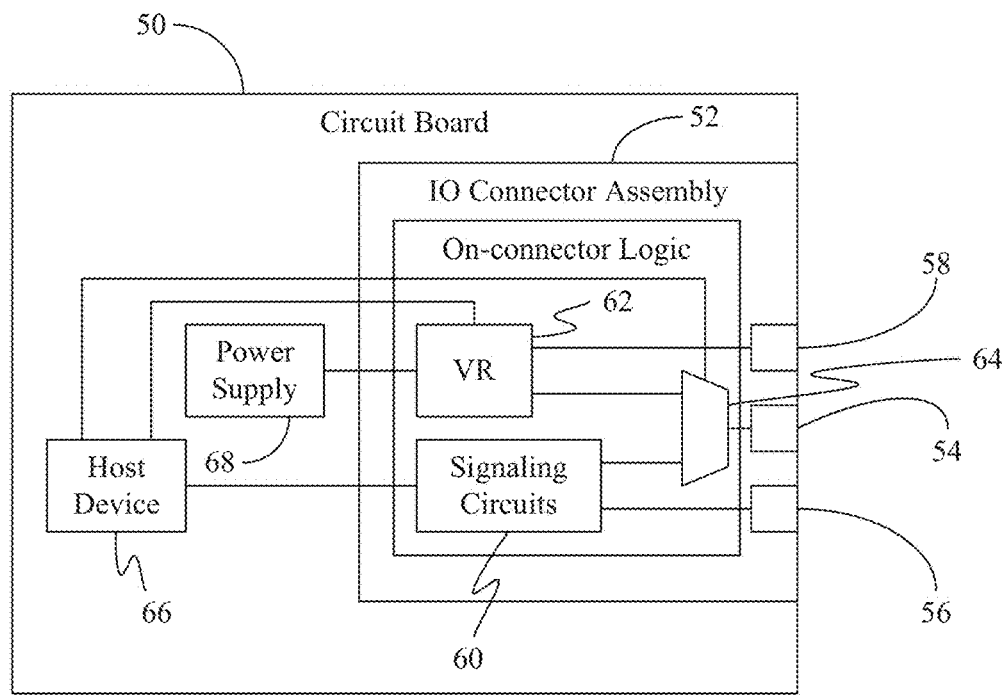

FIG. 3B shows an alternative embodiment in which a circuit board 50 includes an IO connector assembly 52 with a first set of contacts 54, a second set of contacts 56, and a third set of contacts 58. In the illustrated example, the second set of contacts 56 has a fixed connection with one or more signaling circuits 60, and the third set of contacts 58 has a fixed connection with a VR 62. Thus, the second set of contacts 56 could be considered dedicated power contacts and the third set of contacts 58 could be considered dedicated power contacts. The first set of contacts 54, on the other hand, may be connected to a multiplexer 64, which can selectively connect the first set of contacts 54 to either the VR 62 or the signaling circuits 60 based on a configuration command from a host device 66. The host device 66 may also set an output voltage of the VR 62, which is connected to a power supply 68 in the example shown.

Figure 4:
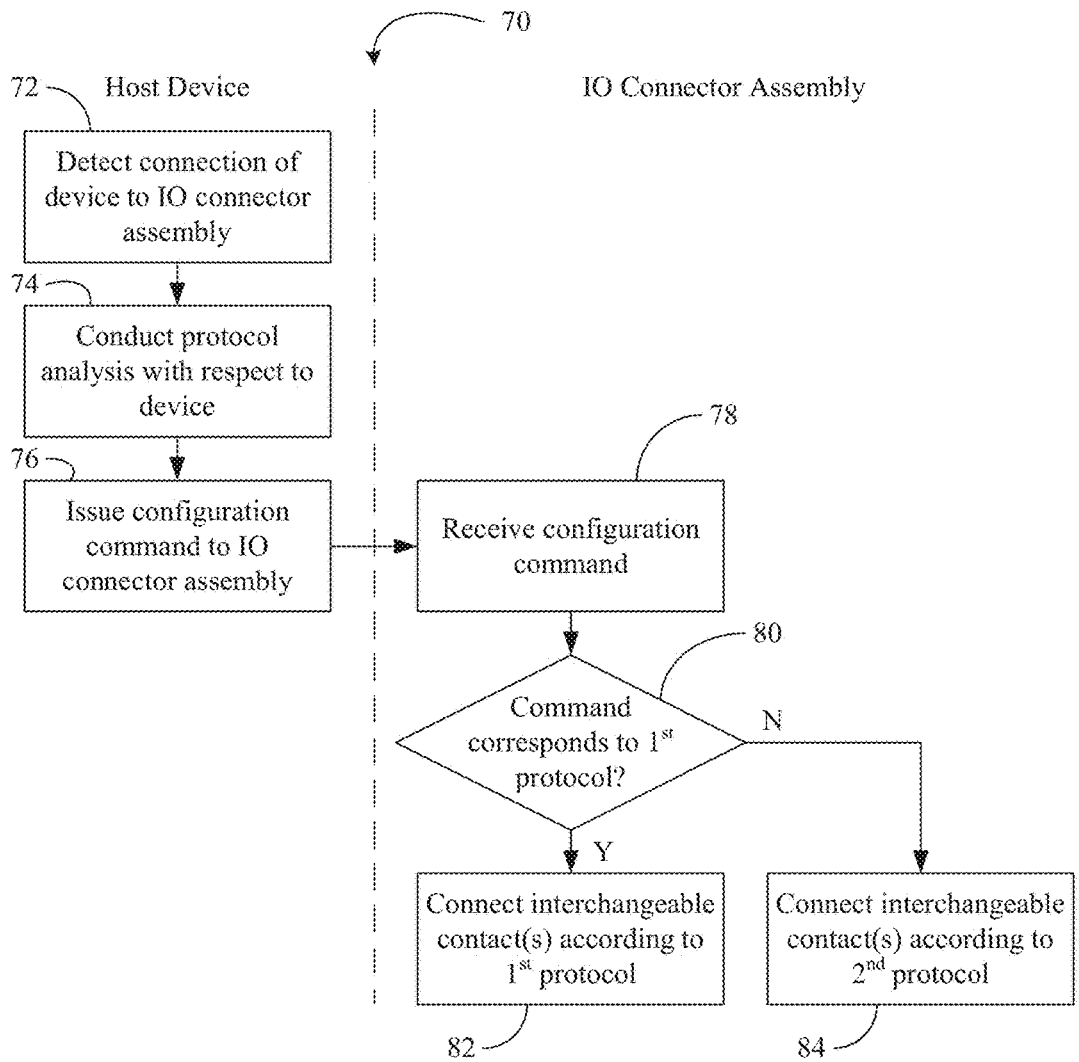
FIG. 4 is a flowchart of an example of a method of configuring an IO connector assembly for communication with a peripheral device according to an embodiment.

FIG. 4 shows a method 70 of an IO connector assembly such as connector assembly 32 (FIG. 3A) or connector assembly 52 (FIG. 3B), already discussed, for communication with a peripheral device. The method 70 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 70 may be written in any combination of one or more programming languages, including an object oriented programming language such as C++ or the like and conventional procedural programming languages, such as the "C" programming language or similar programming languages. Moreover, the method 70 could be implemented using any of the aforementioned circuit technologies.

Processing block 72 provides for detecting a connection of a peripheral device to the IO connector assembly at a host device. As already noted, the host device might include a chipset component such as a processor and/or PCH, wherein detection of the peripheral device may be conducted through one or more signaling circuits of the IO connector assembly. Moreover, the peripheral device could include, for example, a keyboard, mouse, camera, PDA, MID, wireless smart phone, media player, imaging device, smart tablet, flash drive, external hard drive, etc., or any combination thereof. Illustrated block 74 provides for conducting a protocol analysis with respect to the peripheral device. The protocol analysis might include, for example, determining whether power is to be applied to the peripheral device, identifying a contact position, configuration and/or usage of the peripheral device, and so forth. A configuration command may be issued to the IO connector assembly at block 76, wherein the configuration command could indicate which protocol is in use by the peripheral device. In one example, the host device is able to distinguish between protocols such as, but not limited to, USB, DisplayPort, HDMI, Thunderbolt, PCI-e, and so forth. Block 76 may also involve setting an output voltage of a VR resident on the IO connector assembly based on the protocol analysis results.

In response to receiving the configuration command at block 78, the IO connector assembly may determine at block 80 which protocol is in use. In the illustrated example, the system distinguishes between two protocols, but a greater number of protocols may be supported depending upon the circumstances. Notwithstanding, if it is determined that the configuration command corresponds to the first protocol, one or more interchangeable contacts of the IO connector assembly can be connected according to the first protocol at block 82. Thus, in the example above, block 82 might involve connecting the interchangeable contacts to the VR of the IO connector assembly. If on the other hand, it is determined that the configuration command corresponds to the second protocol, illustrated block 84 connects the interchangeable contacts according to the second protocol. Thus, block 84 could involve connecting the interchangeable contacts to one or more signaling circuits of the IO connector assembly.

Thus, by selectively connecting contacts of an IO connector assembly to either a dedicated power source or signaling circuits, techniques described herein enable bandwidth to be added to the IO signaling architecture on demand. The use of interchangeable contacts may also enable the implementation of truly universal IO connectors, smaller platforms, and more scalable architectures. Moreover, enhanced power management can be achieved by dynamically identifying scenarios in which peripheral devices contain their own power sources and do not need power from the host platform.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a host device including host logic to issue a configuration command;
a peripheral device connected to the host device, the peripheral device to communicate with the host device using a selected protocol;
a power supply coupled to the host device and providing power to the peripheral device; and
an input/output (IO) connector assembly having a voltage regulator connected to the power supply, one or more signaling circuits, a first set of contacts, a second set of contacts connected to the one or more signaling circuits, a third set of contacts coupled to the voltage regulator, and connector logic to,
receive the configuration command,
connect the first set of contacts to the voltage regulator if the configuration command indicates that the selected protocol corresponds to a first protocol, and
connect the first set of contacts to the one or more signaling circuits if the configuration command indicates that the selected protocol corresponds to a second protocol,
wherein the second set of contacts are dedicated signaling contacts and directly connects the peripheral device to the one or more signaling circuits,
wherein the third set of contacts are dedicated power contact and directly connects the peripheral device to the voltage regulator, and
wherein the first set of contacts, the second set of dedicated signaling contacts, and the third set of dedicated power contacts are housed within a standard size USB port.

2. The system of claim 1, wherein the IO connector assembly further includes:
a housing;
a substrate including the first and second sets of contacts, wherein the first and second sets of contacts are disposed within the housing; and
a semiconductor package coupled to the substrate, wherein the semiconductor package includes the voltage regulator, the one or more signaling circuits and the connector logic.

3. The system of claim 1, wherein the connector logic includes a multiplexer to selectively connect the first set of contacts to at least one of the voltage regulator and the one or more signaling circuits.

4. The system of claim 1, wherein the first set of contacts includes one or more interchangeable contacts.

5. The system of claim 1, wherein the second set of contacts includes one or more IO contacts.

6. The system of claim 1, wherein the host logic is to,
detect a connection of the peripheral device to the IO connector assembly, and
conduct a protocol analysis with respect to the device, wherein the configuration command is to be issued based on the protocol analysis.

7. The system of claim 6, wherein the protocol analysis includes a determination as to whether power is to be applied to the device.

8. The system of claim 6, wherein the host device is coupled to the voltage regulator and the host logic is to set an output voltage of the voltage regulator based on the protocol analysis.

9. An input/output (IO) connector assembly comprising:
a voltage regulator coupled to a host device and providing power to a peripheral device;
one or more signaling circuits;
a first set of contacts;
a second set of contacts connected to the one or more signaling circuits;
a third set of contacts connected to the voltage regulator; and
logic to,
receive a configuration command,
connect the first set of contacts to the voltage regulator if the configuration command indicates that a selected protocol corresponds to a first protocol, and
connect the first set of contacts to the one or more signaling circuits if the configuration command indicates that the selected protocol corresponds to a second protocol,
wherein the second set of contacts are dedicated signaling contacts and directly connects the peripheral device to the one or more signaling circuits,
wherein the third set of contacts are dedicated power contact and directly connects the peripheral device to the voltage regulator, and
wherein the first set of contacts, the second set of dedicated signaling contacts, and the third set of dedicated power contacts are housed within a standard size USB port.

10. The IO connector assembly of claim 9, further including:
a housing;
a substrate including the first and second sets of contacts, wherein the first and second sets of contacts are disposed within the housing; and
a semiconductor package coupled to the substrate, wherein the semiconductor package includes the voltage regulator, the one or more signaling circuits and the logic.

11. The IO connector assembly of claim 9, wherein the logic includes a multiplexer to selectively connect the first set of contacts to at least one of the voltage regulator and the one or more signaling circuits.

12. The IO connector assembly of claim 9, wherein the first set of contacts includes one or more interchangeable contacts.

13. The IO connector assembly of claim 9, wherein the second contacts includes one or more IO contacts.

14. A computer implemented method comprising:
issuing a configuration command to an input/output (IO) connector assembly, the configuration command indicating that a peripheral device communicates with a host device via the IO connector assembly using a selected protocol;
connecting a first set of contacts of the IO connector assembly to a voltage regulator of the IO connector assembly if the configuration command indicates that the selected protocol corresponds to a first protocol;
connecting the first set of contacts to one or more signaling circuits of the IO connector assembly if the configuration command indicates that the selected protocol corresponds to a second protocol;
directly connecting a peripheral device to the one or more signaling circuits of the IO connector assembly via a second set of contacts; and
directly connecting the peripheral device to the voltage regulator of the IO connector assembly via a third set of contacts;
wherein the voltage regulator is coupled to a power supply and provides power to the peripheral device,
wherein the first set of contacts, the second set of dedicated signaling contacts, and the third set of dedicated power contacts are housed within a standard size USB port.

15. The method of claim 14, further including:
detecting a connection of the peripheral device to the IO connector assembly; and
conducting a protocol analysis with respect to the device, wherein the configuration command is issued based on the protocol analysis.

16. The method of claim 15, wherein the protocol analysis includes a determination as to whether power is to be applied to the device.

17. The method of claim 16, further including setting an output voltage of the voltage regulator based on the protocol analysis.

18. At least one non-transitory computer readable storage medium comprising a set of instructions which, when executed by a processor, cause a computer to:
detect a connection of a peripheral device to an IO connector assembly via a first set of contacts;
conduct a protocol analysis with respect to the peripheral device;
issue a configuration command to the IO connector assembly based on the protocol analysis, the configuration command indicates that a peripheral device communicates with a host device via the IO connector assembly using a selected protocol;
connecting the first set of contacts of the connector assembly to a voltage regulator of the connector assembly if the configuration command indicates that the selected protocol corresponds to a first protocol;
connecting the first set of contacts to one or more signaling circuits of the connector assembly if the configuration command indicates that the selected protocol corresponds to a second protocol; and
directly connect the peripheral device to the IO connector assembly via a second set of dedicated signaling contacts and/or third set of dedicated power contacts;
wherein the voltage regulator is to be coupled to a power supply and is to provide power to the peripheral device, and wherein the first set of contacts, the second set of dedicated signaling contacts, and the third set of dedicated power contacts are housed within a standard size USB port.

19. The at least one non-transitory computer readable storage medium of claim 18, wherein the protocol analysis includes a determination as to whether power is to be applied to the device.

20. The at least one non-transitory computer readable storage medium of claim 18, wherein the instructions, if executed, further cause a computer to set an output voltage of a voltage regulator of the IO connector assembly based on the protocol analysis.

* * * * *